United States Patent [19]

Dunne

[11] Patent Number: 4,477,041

[45] Date of Patent: Oct. 16, 1984

[54] HEAD AND NECK RESTRAINT SYSTEM

[76] Inventor: Michael Dunne, 9012 Beatty Dr., Alexandria, Va. 22308

[21] Appl. No.: 409,684

[22] Filed: Aug. 19, 1982

[51] Int. Cl.$^3$ ............................................. B64D 25/04
[52] U.S. Cl. ......................... 244/122 AG; 244/122 R; 297/475
[58] Field of Search ................ 244/122, 141; 280/801, 280/808, 748; 297/464–468, 474, 475; 269/328; 128/133, 134; 2/410, 411, 6

[56] References Cited

U.S. PATENT DOCUMENTS

| | | | |
|---|---|---|---|
| 2,521,203 | 9/1950 | Cotton | 244/122 B |
| 2,638,293 | 5/1953 | Lindstrom | 244/122 AE |
| 2,901,750 | 9/1959 | McMurry | 2/6 |
| 3,310,811 | 3/1967 | Iacono | 2/6 |
| 3,329,464 | 7/1967 | Barwood et al. | 244/122 B |
| 3,645,480 | 2/1972 | Forman | 244/122 AG |
| 3,698,670 | 10/1972 | Ewing | 244/122 AG |
| 4,231,117 | 11/1980 | Aileo | 2/6 |

FOREIGN PATENT DOCUMENTS

| | | | |
|---|---|---|---|
| 978422 | 12/1964 | United Kingdom | 244/122 AG |
| 1012355 | 12/1965 | United Kingdom | 244/122 B |

Primary Examiner—Trygve M. Blix
Assistant Examiner—Rodney Corl
Attorney, Agent, or Firm—Jim Zegeer

[57] ABSTRACT

The invention relates to an improved ejection seat restraint system for protecting the head and neck and spinal cord from injuries resulting from rapid forward deceleration and ejection from aircraft. The neck of human beings is at risk from lethal spinal cord injury with rupture of the atlanto-occipital membrane which holds the base of the skull to first cervical vertebra. Such lethal injuries according to the invention are prevented by a single inertial reel connection to the helmet of the user, at a point, aligned with or slightly above the superior nuchal line of the skull of the user. The helmet includes forehead padding, a wrap around cup shaped chin strap and an adjustable nape strap. The webbing for the inertial reel connection is preferably medium to soft. The slight forward movement of the head and neck allowed by soft/medium webbing will attenuate the forces applied to the head and neck junction during forward-deceleration or upward vertical ejection-acceleration (from a military high performance fighter/bomber aircraft). Thus, the restraint is along a line passing through a very small zone located at the lower central posterior area of the back of the head.

10 Claims, 9 Drawing Figures

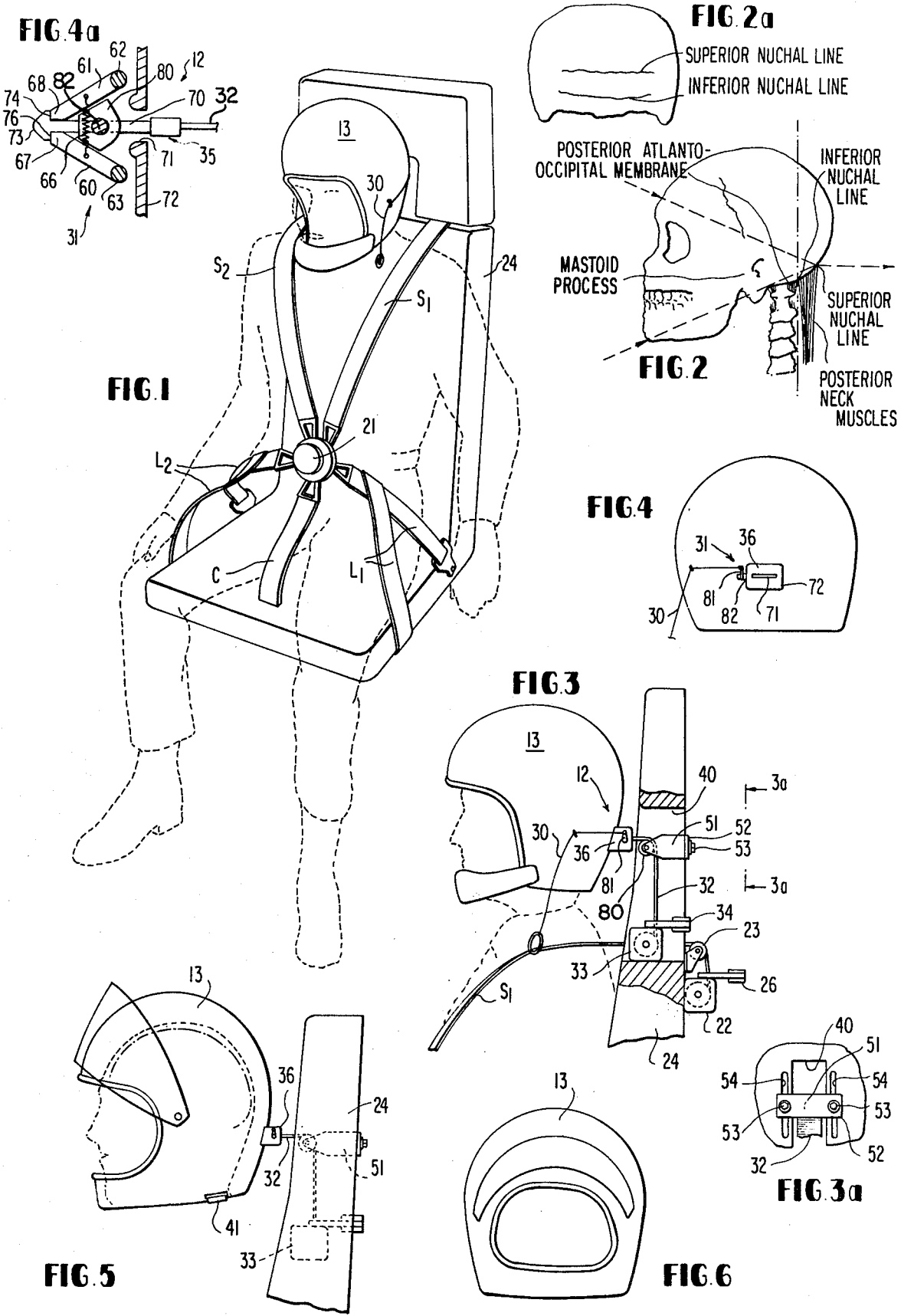

HEAD AND NECK RESTRAINT SYSTEM

This is related to my application Ser. No. 123,315 filed Feb. 21, 1980 and now abandoned.

BACKGROUND OF THE INVENTION

This invention relates to ejection seats for aircraft.

During ejection from an aircraft, the head may be thrown forward and downward, sometimes causing severe or fatal posterior spinal column, and/or posterior spinal cord injury to the ejected aircrewman.

To prevent injury to the body, arms, and legs, restraint systems have been devised for use with ejection seats. To prevent injury to the head and neck, the ejection handle was placed over the head and attached to a face curtain, which was pulled downward to cover the face during ejection from the aircraft.

With recent aircraft improvements in altitude and maximum speed of aircraft operation, the need for more positive head restraint has been indicated. Various inventions to prevent head and neck injury have been devised, for example, in the Martin-Baker Aircraft Co., Ltd. U.K. Pat. Nos. 583,257, and 1,012,355. These United Kingdom patents were also taken out in the United States, France, Switzerland, and Sweden. The U.K. Pat. No. 1,012,355 involved:

"head-restraining equipment for an aircraft ejection seat including a head rest, comprising: a retraction mechanism adapted to be mounted on the seat; such retraction mechanism including a rotatable reel for a flexible member adapted to connect said mechanism to the head of an airman in an ejection seat; said retraction mechanism being operative to apply tension to said flexible member to draw the airman's head against said head rest: means being provided to permit actuation of the mechanism by fluid pressure if desired; and means operative subsequently to operation of said retraction mechanism for disabling the connection between the retraction mechanism and the seat occupant's head."

The above head restraint invention, and others, were subsequently abandoned or did not become accepted for various reasons, including problems with helmet retention and cumbersomeness.

In some restraining systems, inertial reel systems are coupled from the seat (ejection or otherwise) to different portions of the helmet. For example, in Lindstrom U.S. Pat. No. 2,638,293, the inertial reel connection is made to the top of the helmet and two additional connections are made to the sides of the helmet. When the connection is made to the top of the helmet, it is possible for relative neck angulation movement to occur between the head of the user and his torso or body which exposes the neck to serious and possibly lethal injury; said connections to the helmet impose undesirable lateral restraint on head movements of the pilot during normal flight operations. Those prior head restraint systems which are effective, impose such constraints on head movement during normal aircraft or vehicle operation as to place their acceptance and use on a relatively low level. In Forman U.S. Pat. No. 3,645,480, a magnetic force is suggested to restrain the head, but this system requires the pilot voluntarily positioning his head in proximity to the electromagnet and in uncontrolled situations, high G forces may well preclude such voluntary positioning on the part of the pilot.

This invention relates to an improved head and neck restraint system for protecting the head, neck, spinal column, and spinal cord from injuries resulting from rapid forward-downward head movements, and from rapid side-to-side head movements, which may occur during high speed ejection from modern aircraft or during automobile crashes involving sudden stop of the vehicle. All previous inventions described the basic mechanism for head-neck restraint but did not provide for a workable restraint system involving helmet, seat-back position, head, and neck: because they were inadequate, all previous head-neck restraint systems have been seldom used.

The main lethal injury from inadequate head and neck restraint during automobile crashes and high speed ejection from aircraft is spinal cord contusion subsequent to rupture of posterior interspinous ligaments of the spinal column, especially the posterior atlanto-occipital (C1-OCC) and posterior atlanto-axial (C1-C2) membranes. The fatal spinal cord injury results from the sudden uncontrolled forward and downward movement of the head, on the neck which is restrained by a shoulder harness restraint system present in aircraft and race cars.

The prevention of fatal neck injuries in race cars and military aircraft ejection seats requires a head and neck restraint system which will compliment the present existing shoulder restraint system, and not produce further injury to the head and neck.

The invention here described relates to an improved head and neck restraint system for protecting the neck and cervical spinal cord from injuries resulting from rapid forward decleration and during ejection from military aircraft. In rapid forward decleration, the head is thrown forward with the shoulders held in site by the shoulder harness system; in ejection upward during emergency escape from a military aircraft, the pilot's body accelerates upward, throwing the head forward and downward, producing posterior neck and cervical spinal cord injury. In each case, the shoulder restraint system augments the uncontrolled forward-downward movement of the head on the neck, producing neck injury.

The present invention relates generally to protective apparatus for protecting the neck of humans, particularly military aircraft pilots and race car drivers, from posterior neck and spinal cord injuries resulting from rapid forward decleration, or rapid upward acceleration.

At relatively low G forces (20 to 30 G) and low speeds (50 to 60 mph), pilots and race car drivers are exposed to potentially lethal cervical spinal cord injury, which may cause a rupture of the posterior atlanto-occipital (C1-OCC) or posterior atlanto-axial (C1-C2) membranes of the cervical spinal cord, with or without subsequent spinal cord contusion. Such lethal injury occurs in military aircraft accidents, during military ejection seat use in high performance aircraft, and in high speed race car crashes, where the shoulders are restrained by seat and shoulder harnesses but the head is unrestrained, and the resultant restraint system is ineffective for preventing injury to the posterior atlanto-occipital/atlanto-axial membranes and spinal cord.

In some recent inventions of restraint systems, inertial reel systems are connected from the seat (ejection or otherwise) to different positions of the helmet. For example, in Martin-Baker U.K. Pat. No. 1,012,355 the inertial reel connection is made to the lower back of the helmet; in Lindstrom U.S. Pat. No. 2,638,963, the inertial reel connection is made to the top and sides of the helmet; in Forman U.S. Pat. No. 3,645,480, the helmet restraint is by a magnetic force which becomes operative when the ejection seat is activated with the pilot placing the helmet against the seat-back magnet site. In these previous inventions, no teaching as to the exact site and strength of restraint was made; no teaching was made as to helmet requirements to prevent movement or exit of the head from the helmet; no specification as to helmet design was made so as to prevent anterior garroting of the pilot if the helmet restraint was operated as designed.

The present invention of an improved head and neck restraint system specifies (1) the site of helmet attachment, (2) the site of seat-back inertial reel adjustment, and, (3) the site of certain helmet design improvements to prevent garroting anterior neck injury and the loss of the helmet during use of the head and neck restraint system.

According to the present invention, an inertial reel connection to the helmet is made above the level of the superior nuchal line of the posterior skull without restricting normal head movements and side vision. To accommodate different size users, the helmet attachment site is chosen for each individual with the helmet in place. The seat-back attachment is height adjustable, so as to assure that the connection to the inertial reel actuator device is along a line such that forward momentum of the user's head transmits a reaction force via the forehead and chin engagements of the user, to the helmet forehead pad and chin strap; through a vector substantially aligned with the superior nuchal line of the user's skull, above the posterior cervical vertebrae. Thus, the restraint is along a reaction line passing through a small zone located at the lower posterior central area of the back of the user's head, said reaction line being substantially perpendicular to the axial line of the vertebrae-skull in the normal erect posture of the user.

BRIEF DESCRIPTION OF THE DRAWINGS

The above and other objects, advantages, and features of the invention will become more apparent upon consideration of the following specification taken in conjunction with the accompanying drawings, wherein:

FIG. 1 is an isometric view of a pilot in an ejection seat incorporating the present invention;

FIG. 2 is a partial view of the upper portion of the human skeleton showing the skull, first upper four cervical vertebrae, and the posterior atlanto-occipital (C1-OCC) and posterior atlanto-axial (C1-C2) membranes, and its relationship to the superior nuchal line (the upper posterior edges of the skull), and an axial line through the vertebrae-skull in the normal erect position of the user;

FIG. 2a is a rear view of a skull illustrating the superior and inferior nuchal lines;

FIG. 3 is a side elevational view of a helmet showing the adjustability of the inertial reel in the seat-back and its attachment opposite the superior nuchal line to the rear portion of a safety crash helmet, and also shows the wide cup-shaped chin strap;

FIG. 3a is a partial rear view showing an adjustment of the inertial reel connection in the seat-back, relative to the superior nuchal line attachment site on the helmet;

FIG. 4 is a view of the rear of the helmet shown in FIG. 3;

FIG. 4a illustrates an exemplary quick release mechanism;

FIG. 5 is a side elevational view of a full face helmet incorporating the invention; and FIG. 6 is a front elevational view of a full face helmet to which the invention has been applied.

BRIEF DESCRIPTION OF THE INVENTION

FIG. 2 illustrates the relative vulnerability of the posterior atlanto-occipital (C1-OCC) and atlanto-axial (C1-C2) membranes, and the upper spinal cord (which contains vasomotor and cardio-respiratory vital centers) to injury from forward and side decelerative/accelerative forces during automobile/aircraft accidents and the use of military aircraft ejection seats.

As shown in FIG. 2, the posterior atlanto-occipital (C1-OCC) and posterior atlanto-axial (C1-C2) membranes are just below the superior nuchal line of the skull, which covers and protects the spinal cord containing the vasomotor and cardio respiratory vital centers. The skull and first four cervical vertebrae (C1-C4) are diagrammatically illustrated along the body's spinal cord in a normal erect position. It is clear from study of FIG. 2, that connection of the inertial reel restraints as in the prior art, to the upper portion of the user's helmet will tend to restrain the upper head portion, but that high G forces may cause angulation movements of the head on the neck if substantially malaligned with the superior nuchal line of the skull.

Connections to the top of the helmet are significantly above the superior nuchal line, and tend to pull the top of the skull backward, producing angulation movement of the head on the neck. Connections below the superior nuchal line of the user will tend to rotate the head forward on the neck, producing angulation movement of the head on the neck.

As shown in FIG. 2, the posterior atlanto-occipital (C1-OCC) and posterior atlanto-axial (C1-C2) membranes are below the level of the superior nuchal line of the skull. A perpendicular line through the superior nuchal line, from back to front, with the head and neck in the normal erect posture, will pass substantially through the center of gravity of the skull, located just above a perpendicular line to the side of the skull through the external auditory meatus (external ear canal).

According to the present invention, the forehead of the user is engaged by the conventional padding of the helmet over the forehead (which must be properly fitted to the user), and the chin, via a wide chin strap capable of withstanding 20-30 G force, which engages the user's chin via the structure of the typical safety crash helmet; conveying such reaction forces bearing on the chin and forehead to a point of connection on the back of the helmet that is aligned with or slightly above ($<\frac{1}{2}"$ above) the superior nuchal line of the skull. As shown in the side elevational view of FIG. 3, the superior nuchal line of the skull is approximately one to three inches above the lower posterior edge of a typical conventional crash helmet.

As shown in FIG. 2, there is a lower or inferior nuchal line and an upper or superior nuchal line; the inertial reel helmet attachment must be substantially at or slightly above ($<\frac{1}{2}"$ above) the superior nuchal line.

With reference to FIGS. 1 and 3, the main body or torso restraints of a typical high performance military aircraft ejection seat 20, may include lap belts $L_1$ and $L_2$, crotch strap C, and shoulder harness $S_1$–$S_2$, all releasably secured to a common single point, quick release fastener 21. These straps and harnesses are coupled to an inertial reel mechanism 22, over an idler roller 23, both mounted on the seat-back 24. Inertial reel 22, automatically retracts and locks the shoulder harness for pre-ejection positioning of the occupant, as shown for example in Strickland, Jr. U.S. Pat. No. 3,077,324, incorporated herein by reference. Thus, the body restraint harness system (including the inertial reel or any other pre-ejection positioning and restraining mechanism or method for the body or torso) are conventional, and are not, per se, a part of this invention.

As is also conventional, after ejection seat escape from an aircraft, are the various webbings of the body restraint system, which will be automatically released after clearance of the ejection seat from the aircraft, by a guillotine cutter 26, allowing subsequent deployment of a parachute.

An inertial reel device 33 is connected via a inertial reel element (cable or webbing belt) 32, to a single point of connection 12 on helmet 13, as located at or slightly above ($<\frac{1}{2}''$ above) the superior nuchal line defined above. In the art, these webbing elements are classified according to the degree of stretch or give, for example, as soft, medium, and hard; the preferred element for the helmet attachment according to this invention should allow some forward movement (no greater than three inches stretch or give), whereas the shoulder harness webbing should be hard (no stretch or give). The slight forward movement of the head and neck allowed by the helmet inertial element will attenuate the forces applied to the head and neck during forward deceleration or upward ejection seat acceleration.

Thus, any rapid deceleration or acceleration of the body of the user, including the head, will result in a retraction and locking of the helmet inertial reel element against the seat-back, preventing any sudden angular movement, foward or lateral, of the head and neck relative to the user's torso. In other words, a restraining force is applied at, or slightly above ($<\frac{1}{2}''$ above) the superior nuchal line of the skull, via a inertial reel element at that level attached to the back of the helmet; which transmits restraining forces (see FIG. 2) to the forehead and chin via the conventional crash helmet forehead padding and a wide cup-shaped 20–30 G chin strap.

According to this invention, the helmet inertial element must be able to withstand 20–30 G force and allow some stretching of the inertial element; the chin strap must be able to withstand 20–30 G force including the chin strap anchorage to the helmet; and last, but not least, to prevent movement of the head inside the helmet, there must be posterior neck padding inside the helmet with an adjustable nape strap able to withstand 20–30 G force.

The advantages of this invention are numerous. Lethal posterior neck and cervical spinal cord injuries will be prevented; freedom of movement of the user's head is not unduly restrained during normal operations; the invention is cost-effective and can be retrofitted to the existing crash helmet. It should not be difficult to incorporate this invention into the existing ejection seats of military aircraft or the seats of racing cars (of course, the requirement for automatic head and torso retraction and guillotine release mechanism would not be present in racing car seat installations).

To accomodate various torso lengths of various users of this invention, to assure a horizontal restraint of the head and neck via the helmet attachment of the inertial reel element at or slightly above the superior nuchal line of the skull, it is essential to provide a height adjustment aperture for the inertial reel element in the seat-back. Such height adjustment aperture should allow up and down adjustment of approximately six to eight inches to allow for various torso lengths of individual users.

In this invention, a manual quick release mechanism may be provided so the user may conveniently release the helmet inertial reel element from the attachment at the back of the helmet.

As illustrated in FIGS. 5 and 6, the invention is applicable to full face helmets as well as to the open-face type illustrated in FIGS. 3 and 4 where a wide chip strap is used. In the case of the helmet, nape strap 41, extending along the back of the helmet so as to engage the nape of the neck to prevent the helmet from being pulled off, is required, but the connection along the nuchal line is the same. The nape strap must be medium webbing able to withstand 20–30 G forces, and must be adjustable and detachable. The shell of these helmets is typically constructed of reinforced fiberglass and include inner styrofoam padding. Head and face/neck contour padding inside the styrofoam padding prevents excessive movements of the head and neck inside the helmet. A flip-up visor which darkens in light and lightness in the dark, with a lock-down and lock-up mechanism may also be provided. The shoulder harness $S_1$ and $S_2$ also of the inertial reel type and, as in conventional, for ejection seat-back ejections and the like, has a quick-release mechanism 21 for quick release after ejection from an aircraft.

As shown in the enlarged view of FIG. 4a, a typical helmet quick-release mechanism may include a pair of link members 60 and 61 pivotted at their spaced apart ends 62 and 63, respectively. The opposite spaced apart ends 67, 68 of link members 60 and 61 are drawn towards each other by a spring 66. When the buckle end 70 is inserted into the slot 71 of helmet restraint attachment unit 36 at attachment site 12, the ends of 67 and 68 of links 60 and 61 are urged apart by the rounded end 73 of buckle 70 and caused to engage behind abutments 74 and 76 by spring 66. A cam 80 commonly engages links 60 and 61 to urge them apart for quick release, the cam being rotated by quick release cable 30 on the side of the helmet or by directly rotating the short handle 81 of cam shaft 82. This quick release is purely exemplary, it being self evident that many conventional quick-release mechanisms can be adapted for use with the invention. In view of the above, the requirements for a helmet inertial reel restraint harness includes a manual release mechanism on the helmet, on one or both sides, but if on one side only preferably the left side of the helmet.

An automatic release is required on the inertial reel mechanism for use during separation of the pilot from the seat in the man-seat separation phase of ejection seat use in high performance military aircraft. In connection with helicopter pilots and race car drivers, since they do not use ejection seats, only a manual release mechanism will be required. According to the invention, the optimal site of attachment to the helmet back must be at or slightly above the superior nuchal line of the skull to give the maximum protection to the cervical spinal cord and the atlanto-occipital membrane. This requirement is met by attaching the helmet harness anchor site a selected distance (typically one to three inches) above the lower back edge of the helmet, that is well fitted to the user. Height adjustment of the inertial reel to the seat-back is necessary to accomodate variable neck/trunk lengths of pilots. Approximately four inches to six inches adjustment should be sufficient (this may accomodate pilots of 5'8" height to about 6'2" in height).

A wide cup-shaped chin strap able to withstand 20-30 G forces (FIGS. 3 and 4) is necessary so as to assure that the transmission of the restraining force is via the forehead and chin of the user, and the helmet itself to the the attachment point of the inertial reel at the rear of the helmet and along the nuchal line.

As shown in FIGS. 3 and 3a, the helmet inertial reel mechanism 33 is secured to a slot 40 in the seat-back 24; roller 60 is mounted on a clevis 51 which is secured to bracket 52; bracket 52 is secured at different vertical positions in the seat-back slot 4, by a pair of bolts 53, which pass through parallel slots 54 at each side of slot 40. The position of the bracket, clevis-roller assembly is adjusted to accomodate the various size of individual users.

From the foregoing, it has been demonstrated that the best way to protect the posterior atlanto-occipital (C1-OCC) and atlanto-axial (C1-C2) membranes of the cervical spinal column, and the underlying cervical spinal cord with its vasomotor and cardio-respiratory vital centers, from injury in forward-deceleration and upward-acceleration ejection from military aircrafts, short of an air bag or net in front of the pilot, is by restraining the helmet via an inertial reel element from the seat-back to the back of the helmet.

What is claimed:

1. A method of protecting the posterior neck and cervical spinal cord from injury when the torso of the user is restrained with respect to selected points on a fixed structure, when subjected to sudden deceleration or acceleration forces, by engaging the chin/forehead of the person's head with portions of a crash helmet, and transmitting the reaction forces bearing on said forehead and chin via said crash helmet and a flexible connection having a predetermined degree of stretch, coaxially along a single line passing only through the superior nuchal line on the back of the skull and substantially perpendicular to the axial line of the vertebrae-skull in the normal erect posture of the user, whereby rapid angulation movements of the head and neck do not occur during sudden forward-deceleration or upward-acceleration with ejection seat usage.

2. The invention defined in claim 1 wherein said fixed structure is a seat-back having a head rest and including, prepositioning the head of the user within the helmet attached to said seat-back by applying a force, via an inertial reel element, along said superior nuchal line to the rear of said crash helmet to draw the head of the person in the posterior direction to the seat-back head rest after actuation of the ejection seat by the user.

3. Protective apparatus for protecting the neck of a person wearing a crash helmet from injury resulting from rapid deceleration or acceleration and neck angulation movement relative to the torso, with the torso being restrained with respect to several points by torso restraining means on a fixed structure and said crash helmet having a wrap around chin strap and a nape strap, the improvement for assuring maximum protection to the atlanto-occipital membrane of the person comprising, means forming a single central helmet attachment site on the rear of said crash helmet which is at the superior nuchal line of the skull of said person and a flexible connector means having a predetermined degree of stretch connected to said attachment site for coupling said single central helmet attachment site to a point included in said fixed structure of said torso restraining means, an inertial reel for prepositioning the head of the user with respect to said fixed structure such that reaction forces transmitted to the user is substantially perpendicular to the axial line of the vertebrae-skull in the normal erect position and, a seat-back forming part of said fixed structure, an height adjustment aperture provided in said seat-back for said helmet inertial reel connection to said attachment site to place the user's head and neck in optimal anatomical alignment with the lower vertebrae column prior to ejection or crash sequence.

4. The invention defined in claim 3 wherein, said inertial reel is on an aircraft ejection seat, and including means for adjusting the vertical position on said ejection seat of the effective point of connection of said flexible connector means to said fixed structure.

5. The invention described in claim 3 wherein, said flexible connection means to said attachment site can withstand 20-30 G force; (b) the chin strap is of a wrap-around cup-shaped design to withstand 20-30 G force; (c) the nape strap is adjustable and 20-30 G strength.

6. The invention described in claim 3 wherein, said torso restraining means includes a shoulder harness restraint system, lap belt and crotch harness restraint system.

7. The invention defined in claim 3 including, an automatic release mechanism present to allow man-seat separation after ejection from aircraft.

8. The invention defined in claim 5 wherein for use with race car drivers' seat or military ejection seat use, a manual quick-release mechanism be provided to the user.

9. The invention defined in claim 3 wherein, said crash helmet includes a full wrap-around chin strap, forehead and chin padding inside the protective helmet, and posterior neck padding and adjustable nape strap in the lower posterior part of the helmet.

10. In a system for protecting the posterior neck and cervical spinal cord from injury when the torso of the user is subjected to sudden acceleration or deceleration forces, said torso being restrained with respect to selected points on a fixed structure including a seat-back including at least shoulder harness webbing and a helmet on the head of said torso coupled to an inertial reel in said seat-back, the improvement comprising, said shoulder harness webbing being a hard webbing, a flexible soft to medium webbing element, means for attaching said soft to medium webbing element to a helmet back attachment site located at or slightly above the superior nuchal line of the user's skull and to said seat back such that reaction forces transmitted to the user are substantially perpendicular to the axial line of the vertebrae-skull in the normal erect position.

* * * * *